UNITED STATES PATENT OFFICE.

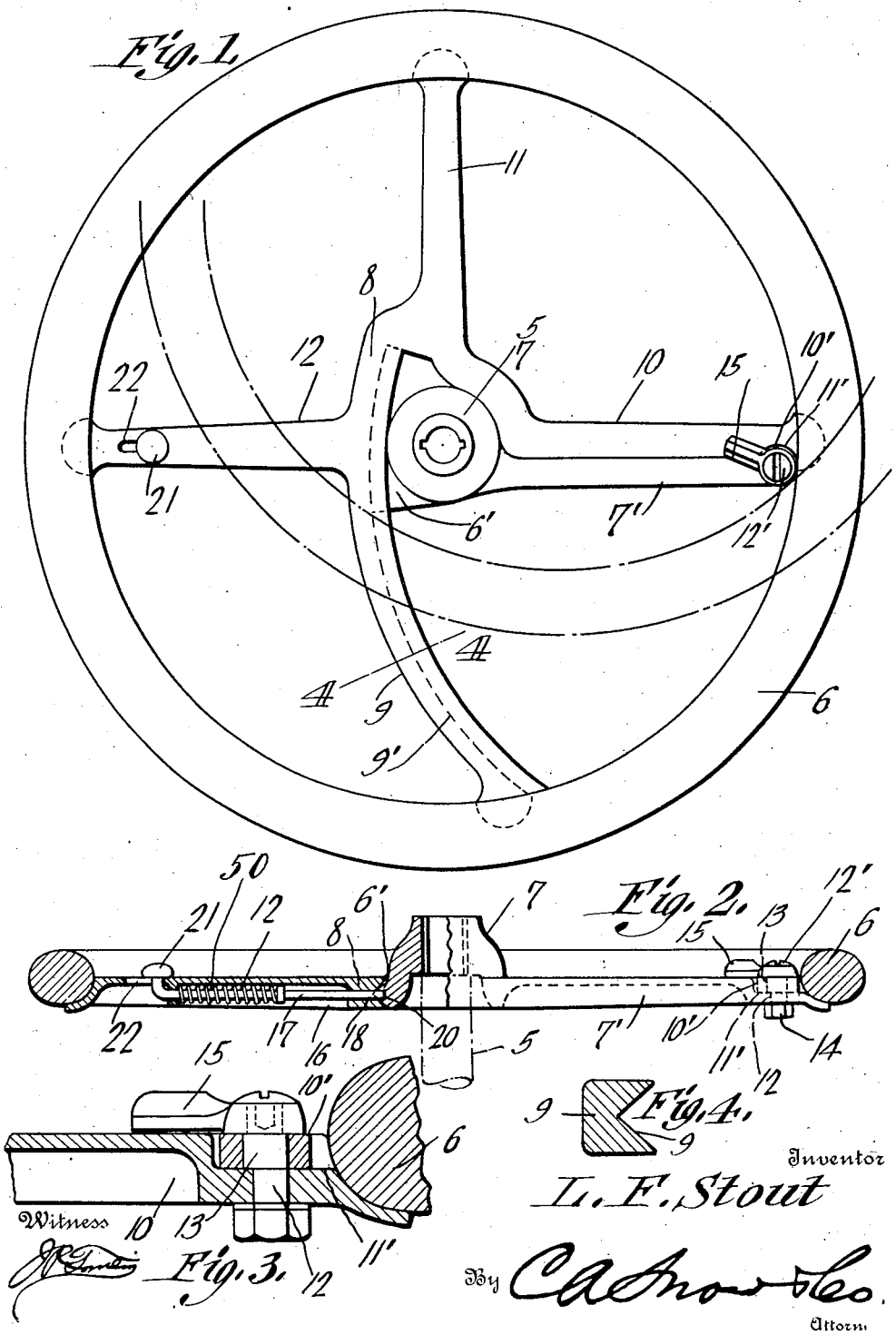

LEWIS FRANK STOUT, OF LOCKPORT, NEW YORK.

STEERING-WHEEL FOR AUTOMOBILES.

1,331,595.       Specification of Letters Patent.      Patented Feb. 24, 1920.

Application filed June 26, 1919. Serial No. 306,911.

*To all whom it may concern:*

Be it known that I, LEWIS F. STOUT, a citizen of the United States, residing at Lockport, in the county of Niagara and State of New York, have invented a new and useful Steering-Wheel for Automobiles, of which the following is a specification.

The present invention relates to steering wheels for automobiles, the primary object being to provide a steering wheel which may be moved to one side and away from the vehicle seat so that the operator may easily pass into and out of the automobile.

A further object is to provide novel means for holding the steering wheel in different positions with respect to the steering post.

In the drawing:—

Figure 1 is a plan view of a steering wheel constructed in accordance with my invention, the dot and dash lines indicating the position to which the steering wheel may be swung;

Fig. 2 is a transverse sectional view taken centrally of the device;

Fig. 3 is an enlarged fragmentary sectional view showing the locking device; and Fig. 4 is a transverse sectional view taken on line 4—4 of Fig. 1.

Referring to the drawings the numeral 5 denotes a steering post and the numeral 6 designates the rim of my improved steering wheel.

The spider of the steering wheel includes a hub 7 adapted to be keyed to the post 5. A flange 6' projects from the hub 7 and has a convexed outer edge which is beveled. Extending laterally from the hub 7 is a rigid arm 7'.

A substantially V-shaped member is designated by the numeral 8 and includes a curved spoke 9 provided with a V-shaped groove 9'. A spoke 10 is provided, and the same includes a curved offset portion 25 forming part of the member 8 and bearing against the hub 7. The curved spoke 9 also bears against the hub 7, both of the spokes 9 and 10 being secured to the wheel rim 6. The convexed edge of the flange 6' is received in the groove 9' slidably. Spokes 11 and 12 project from the V-shaped member 8 and are connected with the rim 6.

An ear 10' is formed upon the outer end of the arm 7' and is received in a recess 11' in the upper face of the outer extremity of the spoke 10. A shaft or bolt 12' passes through the ear 10' and through the spoke 10 and is provided with an eccentric 13 rotatable in the ear 10'. A nut 14 is threaded upon one end of the bolt 12 and an operating handle 15 is fixed to the opposite end of the bolt. When the shaft or bolt 12 is rotated by means of the handle 15, the eccentric 13 produces movement of the wheel with respect to the hub 7 and seats the edge of the flange 6' firmly in the groove 9' of the spoke 9.

The spoke 12 is provided with a longitudinal groove 16 in which is mounted a slidable bolt 17, normally urged by a spring 50 into an opening 18 in the V-shaped member 8 and engaged in an opening 20 in the flange 6' to lock the wheel positively against movement in concentric relation to the post 5. The outer end of the bolt 17 is turned upwardly and disposed in a slot 22 in the spokes 12, said end being provided with a head 21 by means of which the bolt is withdrawn from the opening 20 in the flange 6' when it is desired to move the steering wheel from the position shown in dotted line in Fig. 1.

When it is desired to swing the steering wheel away from the seat of the vehicle, the operator rotates the bolt 12 by means of the handle 15 and retracts the slidable bolt 17 from the opening 20 in the flange 6', the wheel being then swung to the position shown in dotted line in Fig. 1.

The construction herein shown and described is considered the preferred embodiment of the invention but it is to be understood that changes in the precise construction may be made within the scope of what is claimed without departing from the spirit or sacrificing any of the advantages of the invention.

The member 8 may be alluded to as a bracket, seat or casting, receiving the hub or post-receiving member 7.

What is claimed is:—

1. In a device of the class described, a hub having a projecting arm; a wheel comprising spokes certain of which define a seat open at one side and receiving the hub; and means for connecting the wheel pivotally with the arm.

2. In a device of the class described, a hub having projecting parts; a wheel embodying spokes, one of which coöperates slidably with one of the hub parts; and a pivot element uniting the wheel with the other of said hub parts, said spoke being curved upon an arc of which the pivot element is a center.

3. In a device of the class described, a hub having a projecting part; a wheel having spokes; and a shaft forming a pivotal connection between the wheel and said part of the hub, the shaft comprising an eccentric constituting means for moving the wheel laterally when the shaft is rotated, thereby to bind one of the spokes with respect to the hub.

4. A device of the class described, constructed as set forth in claim 3, and further characterized by a locking device mounted on the wheel and coöperating with a part of the hub to hold the wheel positively in concentric relation with respect to the hub.

5. In a device of the class described, a hub having projecting parts; a wheel embodying spokes, one of which coöperates slidably with one of the hub parts; and a shaft forming a pivotal connection between the wheel and the other of said hub parts, said spoke being curved upon an arc the center of which is the shaft, the shaft comprising an eccentric constituting means for moving the wheel laterally when the shaft is rotated, thereby to bind said spoke upon the hub part wherewith the spoke coöperates.

6. In a steering wheel, the combination with a steering post, of a post-receiving member adapted to be keyed to the steering post, an arm extending laterally from the post-receiving member, a V-shaped bracket having one of its legs longitudinally curved, the other leg being formed with a curved offset part which bears against the post-receiving member, the legs constituting spokes, divergent spokes extending from the V-shaped bracket, one of the legs of the V-shaped bracket being pivotally connected with the arm, and a latch carried by one of the divergent spokes and adapted to engage the post-receiving member, to retain the bracket and spokes locked to rotate with the post-receiving member, and a steering wheel rim carried by the ends of the spokes.

7. In a steering wheel, the combination with a steering post, of a post-receiving member removably mounted thereon, an arm extending rigidly from the post-receiving member, a V-shaped casting, one leg of which being longitudinally curved and positioned against the post-receiving member, the opposite leg being formed with a curved offset portion which is also positioned against the post-receiving member, divergent spokes formed with the V-shaped member and extending radially from the post-receiving member, a bolt extending from the outer end of the arm and one leg of the V-shaped casting and formed with a cam, a handle for rotating the bolt fixed to one end thereof to lock the arm and spoke against movement, one of the divergent spokes being formed with a longitudinal groove, a bolt slidable in the groove and through the longitudinally curved spokes and engageable with the bolt-receiving member, and a spring encircling the bolt and urging the same into engagement with the post-receiving member.

In testimony that I claim the foregoing as my own, I have hereto affixed my signature in the presence of two witnesses.

LEWIS FRANK STOUT.

Witnesses:
T. M. BRONSON,
H. J. WALKER.